US008610759B2

(12) United States Patent
McKiel, Jr.

(10) Patent No.: US 8,610,759 B2
(45) Date of Patent: Dec. 17, 2013

(54) METHODS AND SYSTEMS FOR PRESENTING ADJUNCT CONTENT DURING A PRESENTATION OF A MEDIA CONTENT INSTANCE

(75) Inventor: Frank A. McKiel, Jr., Colorado Springs, CO (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 468 days.

(21) Appl. No.: 12/912,007

(22) Filed: Oct. 26, 2010

(65) Prior Publication Data

US 2012/0098934 A1    Apr. 26, 2012

(51) Int. Cl.
*H04N 13/02*    (2006.01)

(52) U.S. Cl.
USPC ............. 348/46; 348/51; 348/56; 348/58

(58) Field of Classification Search
USPC ................. 348/42–60; 375/240.16
See application file for complete search history.

(56) References Cited

U.S. PATENT DOCUMENTS

| | | | |
|---|---|---|---|
| 5,963,371 A * | 10/1999 | Needham et al. | 359/464 |
| 6,057,811 A * | 5/2000 | Edwards | 345/8 |
| 7,164,779 B2 * | 1/2007 | Yerazunis et al. | 382/100 |
| 2006/0109377 A1 | 5/2006 | Chao | |
| 2007/0053513 A1 | 3/2007 | Hoffberg | |
| 2007/0139519 A1 | 6/2007 | Decusatis et al. | |
| 2007/0171275 A1 | 7/2007 | Kenoyer | |
| 2007/0263003 A1 * | 11/2007 | Ko et al. | 345/502 |
| 2008/0192067 A1 | 8/2008 | Barenbrug et al. | |
| 2009/0073108 A1 | 3/2009 | Gorog | |
| 2010/0208042 A1 * | 8/2010 | Ikeda et al. | 348/53 |
| 2010/0226628 A1 | 9/2010 | Yamaji et al. | |
| 2012/0092469 A1 * | 4/2012 | Kovalick | 348/56 |

* cited by examiner

*Primary Examiner* — Sath V Perungavoor
*Assistant Examiner* — Jeffery Willaims

(57) ABSTRACT

An exemplary method includes an adjunct content presentation system including adjunct content within a first image of a media content instance by setting a pixel value of a first group of pixels included in the first image to be greater than a predetermined neutral pixel value, including the adjunct content within a second image of the media content instance by setting a pixel value of a second group of pixels included in the second image and corresponding to the first group of pixels to be less than the predetermined neutral pixel value, and presenting the first and second images. The respective pixel values are set to result in the adjunct content being perceptible to a first viewer viewing only one of the first and second images and substantially imperceptible to a second viewer viewing both the first and second images. Corresponding methods and systems are also disclosed.

23 Claims, 9 Drawing Sheets

US 8,610,759 B2

METHODS AND SYSTEMS FOR PRESENTING ADJUNCT CONTENT DURING A PRESENTATION OF A MEDIA CONTENT INSTANCE

BACKGROUND INFORMATION

Viewers of movies, television programs, and other types of media content often differ in the amount and/or type of additional information they would like to see while watching the media content. For example, some people prefer to see subtitles when watching a movie or television program while others do not. As another example, some people like to see ticker tape information (e.g., sports scores, news, stock updates, etc.) scrolling across the bottom of a television screen while others consider such information to be distracting or annoying. When more than one person watches media content displayed by a single display device at the same time (e.g., when a family watches a movie or television program together), these differences in viewing preferences can cause dissatisfaction, disagreement, and even contention among those watching the media content.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
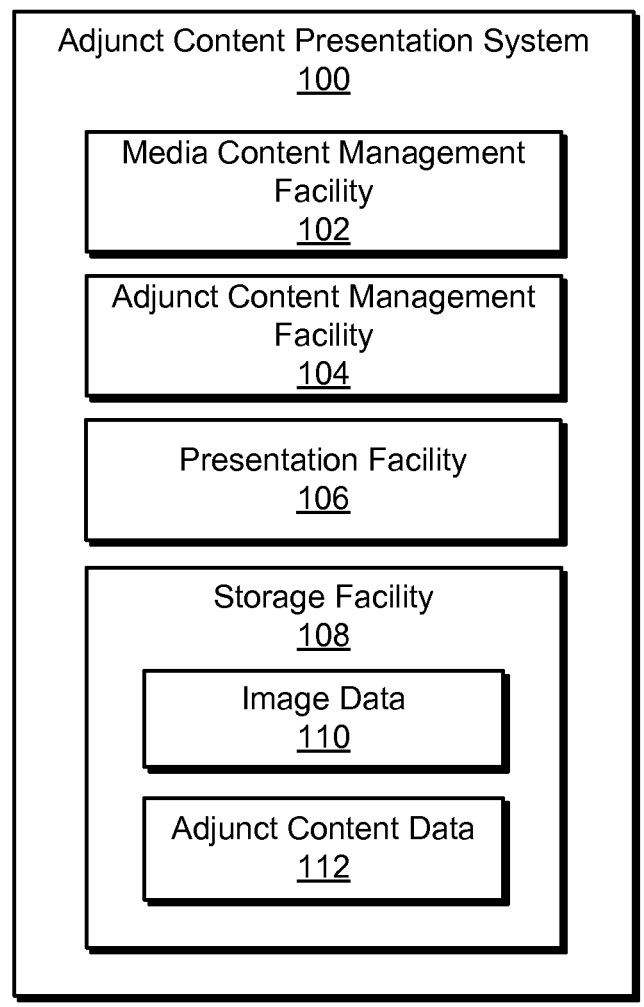
FIG. 1 illustrates an exemplary adjunct content presentation system according to principles described herein.

Methods and systems for presenting adjunct content during a presentation of a media content instance are described herein. In some examples, an adjunct content presentation system may include adjunct content within a first image of a media content instance by setting a pixel value of a first group of pixels included in the first image to be greater than a predetermined neutral pixel value, include the adjunct content within a second image of the media content instance by setting a pixel value of a second group of pixels included in the second image and corresponding to the first group of pixels to be less than the predetermined neutral pixel value, and present the first and second images. The pixel values of the first and second groups of pixels may be set to result in the adjunct content being perceptible to a first viewer viewing only one of the first and second images during the presentation of the first and second images and substantially imperceptible to a second viewer viewing both the first and second images during the presentation of the first and second images.

As will be described in more detail below, the first viewer (i.e., the viewer able to perceive the adjunct content) may be wearing three-dimensional ("3D") viewing glasses but have only one of his or her eyes open during the presentation of the first and second images. Alternatively, the first viewer may be wearing 3D viewing glasses but have vision out of one eye selectively obstructed in some way during the presentation of the first and second images. In another alternative example, the first viewer may be wearing viewing glasses having identical polarizing filters in each lens during the presentation of the first and second images.

In contrast, the second viewer (i.e., the viewer not able to perceive the adjunct content) may not be wearing 3D viewing glasses during the presentation of the first and second images. Alternatively, the second viewer may be wearing three-dimensional ("3D") viewing glasses and have both of his or her eyes open during the presentation of the first and second images. As will be described in more detail below, the second viewer may not be able to perceive the adjunct content because the pixel values of the pixels associated with the adjunct content included in both the first and second images may be set to effectively cancel each other out.

Hence, the methods and systems described herein may allow some viewers to watch a media content instance without seeing adjunct content displayed therewith. At the same time, the methods and systems described herein may allow other viewers to see adjunct content while watching the media content instance. In this manner, divergent viewing preferences of multiple viewers concurrently watching a media content instance being displayed on a particular display screen (e.g., in a theatre or in the home) may be satisfied.

As used herein, the term "adjunct content" refers to any content that may be displayed concurrently with a media content instance on a display screen. In some examples, the adjunct content may be related to the media content instance. To illustrate, the adjunct content may include subtitle content associated with the media content instance (e.g., closed captioning content), enhanced content associated with the media content instance (e.g., commentary, statistics, elapsed time information, remaining time information, content associated with a video game, metadata, and/or any other type of information associated with the media content instance), and/or any other type of content related to the media content instance. Additionally or alternatively, the adjunct content may be unrelated to the media content instance. Examples of such unrelated adjunct content include, but are not limited to, ticker tape information (e.g., sports scores, news, and/or stock updates), messaging content (e.g., text messages intended for one or more viewers of the media content instance), notification content (e.g., notifications alerting a viewer of an incoming telephone call), and/or any other content unrelated to the media content instance as may serve a particular implementation. Adjunct content may include text, one or more images, or a combination thereof. For illustrative purposes only, it will be assumed in the examples given herein that adjunct content includes only text.

As used herein, "media content" may refer generally to any video content that may be presented to one or more viewers. The term "media content instance" will be used herein to refer to any video, movie, television program, on-demand media program, pay-per-view media program, broadcast media program (e.g., broadcast television program), IPTV media content, video game, advertisement, image, or any segment, component, or combination of these or other forms of media content that may be viewed by one or more viewers. A media content instance may include two-dimensional ("2D") video content and/or 3D video content.

As used herein, the term "pixel value" may be representative of or refer to any visual attribute of a pixel or group of pixels that may be included in an image that is presented to one or more viewers. For example, a pixel value may be representative of a brightness level, a color value, a hue value, a saturation value, and/or any other visual attribute of a pixel as may serve a particular implementation. For illustrative purposes only, the examples given herein will be explained in terms of brightness level.

FIG. 1 illustrates an exemplary adjunct content presentation system 100 (or simply "system 100"). As will be described in more detail below, system 100 may be configured to facilitate selective perception of adjunct content by one or more viewers of a media content instance.

System 100 may include, but is not limited to, a media content management facility 102, an adjunct content management facility 104, a presentation facility 106, and a storage facility 108, which may be in communication with one another using any suitable communication technologies. It will be recognized that although facilities 102-108 are shown to be separate facilities in FIG. 1, any of those facilities may be combined into a single facility as may serve a particular application.

Media content management facility 102 may be configured to manage (e.g., generate, maintain, provide, etc.) media content that may be displayed on a display screen. A particular media content instance may include main content (as opposed to adjunct content) and may be presented in the form of a plurality of sequentially presented main content images representative of the media content instance.

In some examples, a particular main content image may be presented by concurrently or sequentially presenting a first image and a second image each comprising content representative of a particular portion of the main content image. When viewed by a viewer wearing appropriately configured 3D viewing glasses, the first and second images may be perceived as a single 3D composite image. When viewed by a viewer not wearing 3D viewing glasses, the first and second images may be perceived as a single 2D composite image, which, in some instances, might appear to be slightly blurry if the main content is intended to be viewed in 3D.

Adjunct content management facility 104 may be configured to manage (e.g., generate, maintain, provide, etc.) adjunct content that may be displayed concurrently with a media content instance on a display screen. For example, adjunct content management facility 104 may include adjunct content within a first image of a media content instance provided by media content management facility 102 by setting a pixel value (e.g., a brightness level) of a first group of pixels included in the first image to be greater than a predetermined neutral pixel value (e.g., a predetermined neutral brightness level). Adjunct content management facility 104 may also include the adjunct content within a second image of the media content instance by setting a pixel value (e.g., a brightness level) of a second group of pixels included in the second image and corresponding to the first group of pixels to be less than the predetermined neutral pixel value (e.g., the predetermined neutral brightness level). As will be described in more detail below, the pixel values of the first and second groups of pixels may be set to result in the adjunct content being perceptible to viewers viewing only one of the first and second images and substantially imperceptible to other viewers viewing both the first and second images.

Adjunct content management facility 104 may be further configured to selectively permit a viewer to view only one of the first and second images and thereby perceive the adjunct content included in the first and second images. Various manners in which adjunct content management facility 104 may selectively permit the viewer to view only one of the first and second images will be described below.

Presentation facility 106 may be configured to present media content provided by media content management facility 102 and adjunct content provided by adjunct content management facility 104 to one or more viewers. For example, presentation facility 106 may present the first and second images provided by media content management facility 102 and modified by adjunct content management facility 104 to include adjunct content. In some examples, presentation facility 106 may provide the first and second images for display on a display screen. The display screen may be located within a theatre or other venue, included as part of a television or other personal media content presentation device, and/or otherwise implemented.

In some examples, presentation facility 106 may be configured to concurrently present the first and second images in accordance with a passive polarized processing technique. As used herein, a "passive polarized processing technique" refers to a method of presenting media content in 3D wherein an image (e.g., the first image) intended for the left eye and an image intended for the right eye (e.g., the second image) are concurrently presented to a viewer. The left and right images may be polarized in mutually orthogonal directions or in any other suitable manner (e.g., using circular polarization). The viewer views the images through polarized 3D viewing glasses so that only the left image is presented to the left eye and so that only the right image is presented to the right eye. The viewer's brain combines the two images into a single 3D image. An exemplary passive polarized processing technique will be described in more detail below.

Additionally or alternatively, presentation facility 106 may be configured to sequentially present the first and second images in accordance with an active shutter processing technique. As used herein, an "active shutter processing technique" refers to a method of presenting media content in 3D wherein images are alternatingly presented to the left and right eyes of a viewer wearing 3D viewing glasses. The 3D viewing glasses, as will be described in more detail below, may be configured to allow only left images to be presented to the left eye and only right images to be presented to the right eye. The images may be presented in rapid enough succession that the viewer does not notice that different images are being presented to each eye at slightly different times. The net effect is that the left eye sees only the images presented to the left eye and the right eye sees only the images presented to the right eye, thereby creating a perception of 3D in the viewer's brain. An exemplary active shutter processing technique will be described in more detail below.

Passive polarized and active shutter processing techniques are merely illustrative of the many 3D content processing techniques that may be used in accordance with the systems and methods described herein. It will be recognized that presentation facility 106 may be configured to operate in accordance with any 3D or 2D media content processing technique as may serve a particular implementation.

Storage facility 108 may be configured to maintain image data 110 representative of one or more images included in a media content instance managed by media content management facility 102 and adjunct content data 112 representative of adjunct content managed by adjunct content management facility 104. Storage facility 108 may maintain additional or alternative data as may serve a particular implementation.

In some examples, system 100 may be implemented using components typically used to present media content in 3D. Hence, an exemplary 3D content presentation system and various 3D media content processing techniques that may be used in accordance with the systems and methods described herein will now be described.

Figure 2:
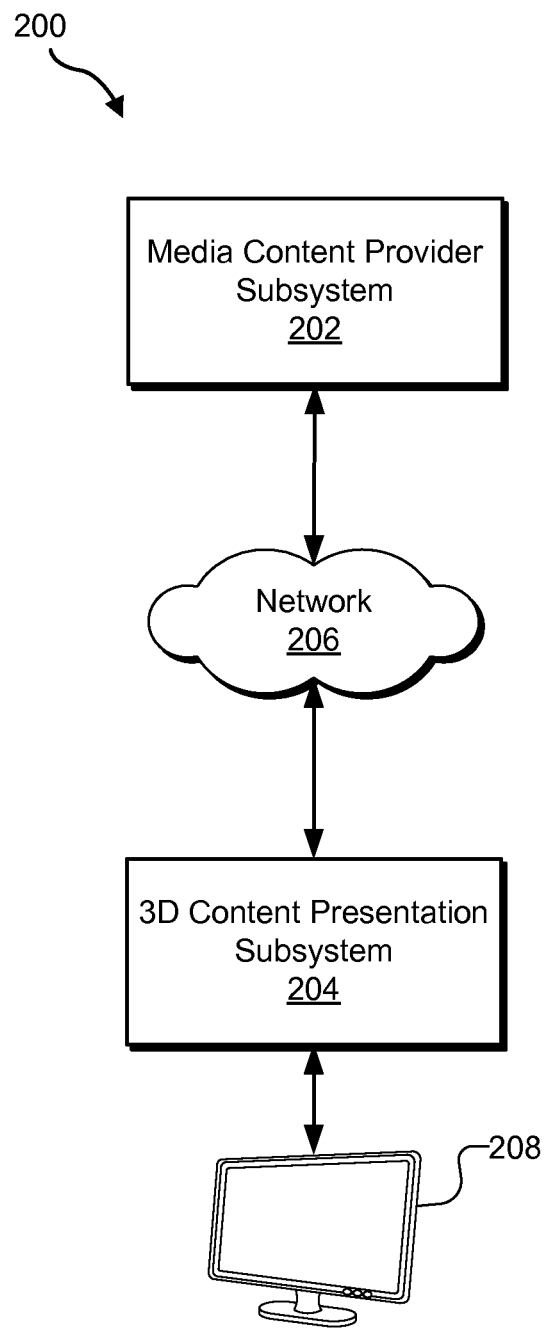
FIG. 2 illustrates an exemplary three-dimensional ("3D") content presentation system according to principles described herein.

FIG. 2 illustrates an exemplary 3D content presentation system 200 that may implement system 100. 3D content presentation system 200 may include a media content provider subsystem 202 (or simply "provider subsystem 202") and a 3D content presentation subsystem 204 in communication with one another via a network 206. Media content management facility 102, adjunct content management facility 104, presentation facility 106, and storage facility 108 may each be implemented on one or both of provider subsystem 202 and 3D content presentation subsystem 204.

Provider subsystem 202 and 3D content presentation subsystem 204 may communicate using any suitable communication technologies, devices, networks, media, and protocols supportive of remote data communications. For example, provider subsystem 202 and 3D content presentation subsystem 204 may communicate over network 206 using any communication platforms and technologies suitable for transporting media content and/or communication signals, including known communication technologies, devices, transmission media, and protocols supportive of remote data communications, examples of which include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Markup Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, radio frequency ("RF") signaling technologies, wireless communication technologies (e.g., Bluetooth, Wi-Fi, etc.), optical transport and signaling technologies, live transmission technologies (e.g., media streaming technologies), media file transfer technologies, in-band and out-of-band signaling technologies, and other suitable communications technologies.

Network 206 may include one or more networks or types of networks (and communication links thereto) capable of carrying communications, media content, and/or data signals between provider subsystem 202 and 3D content presentation subsystem 204. For example, network 206 may include, but is not limited to, one or more wireless networks (e.g., satellite media broadcasting networks or terrestrial broadcasting networks), mobile telephone networks (e.g., cellular telephone networks), closed media networks, open media networks, subscriber television networks (e.g., broadcast, multicast, and/or narrowcast television networks), closed communication networks, open communication networks, satellite networks, cable networks, hybrid fiber coax networks, optical fiber networks, broadband networks, narrowband networks, the Internet, wide area networks, local area networks, public networks, private networks, packet-switched networks, and any other networks capable of carrying data and/or communications signals between provider subsystem 202 and 3D content presentation subsystem 204. Communications between provider subsystem 202 and 3D content presentation subsystem 204 may be transported using any one of above-listed networks, or any combination or sub-combination of the above-listed networks.

While FIG. 2 shows provider subsystem 202 and 3D content presentation subsystem 204 communicatively coupled via network 206, it will be recognized that provider subsystem 202 and 3D content presentation subsystem 204 may be configured to communicate one with another in any other suitable manner (e.g., via a direct connection).

In some examples, provider subsystem 202 may be configured to generate or otherwise provide media content (e.g., in the form of one or more media content streams) to 3D content presentation subsystem 204. Provider subsystem 202 may additionally be configured to provide adjunct content to 3D content presentation subsystem 204.

3D content presentation subsystem 204 may be configured to present media content received from provider subsystem 202. 3D content presentation subsystem 204 may additionally or alternatively be configured to present adjunct content received from provider subsystem 202, generated by 3D content presentation subsystem 204, and/or received from any other source.

As shown in FIG. 2, 3D content presentation subsystem 204 may be communicatively coupled to a display device 208. Exemplary display devices 208 include, but are not limited to, televisions, computer monitors, handheld computing devices with display screens, mobile devices (e.g., mobile phones), and/or any other device comprising a display screen on which media content may be displayed. 3D content presentation subsystem 204 may present media content and/or adjunct content by way of display device 208.

In certain embodiments, system 100 may be implemented entirely by or within provider subsystem 202 or 3D content presentation subsystem 204. In other embodiments, components of system 100 may be distributed across provider subsystem 202 and 3D content presentation subsystem 204. For example, 3D content presentation subsystem 204 may include a client (e.g., a client application) implementing one or more of the facilities of system 100.

Provider subsystem 202 may be implemented by one or more computing devices. For example, provider subsystem 202 may be implemented by one or more server devices. Additionally or alternatively, 3D content presentation subsystem 204 may be implemented as may suit a particular implementation. For example, 3D content presentation subsystem 204 may be implemented by one or more media content presentation devices, which may include, but are not limited to, a media content projector device, a set-top box device, a DVR device, a media content processing device (e.g., a DVD player), a communications device, a mobile access device (e.g., a mobile phone device, a handheld device, a laptop computer, a tablet computer, a personal-digital assistant device, etc.), a personal computer, a gaming device, a television device, and/or any other device configured to perform one or more of the processes and/or operations described herein.

Figure 3:
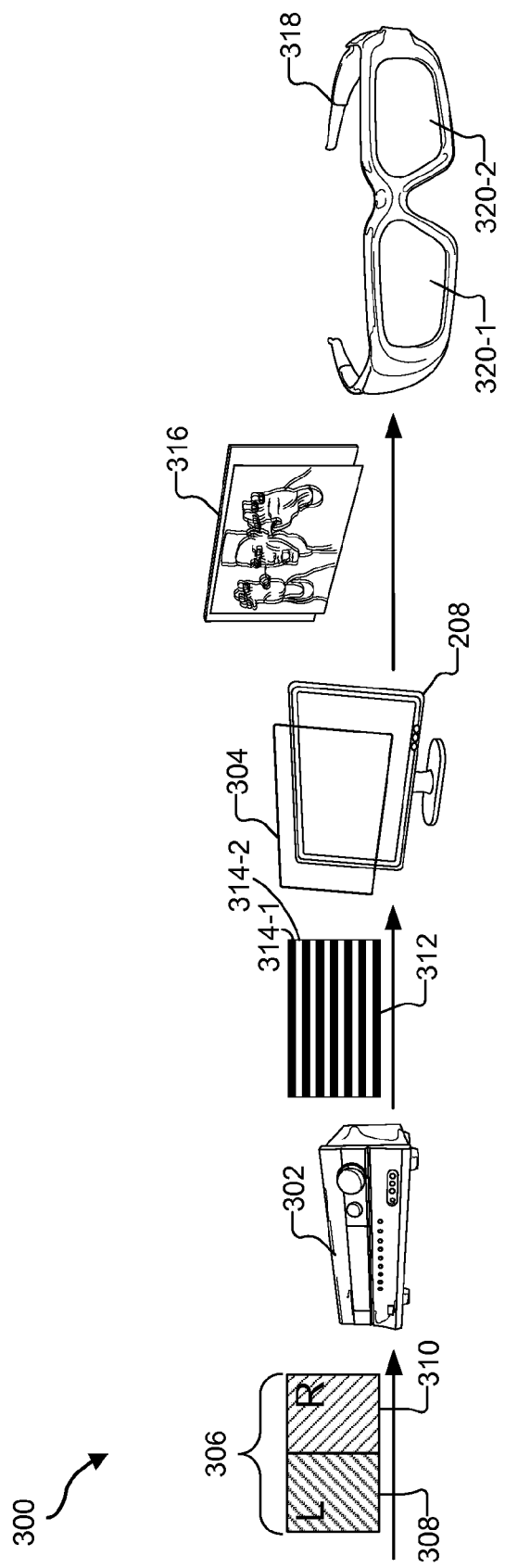
FIG. 3 illustrates an exemplary implementation of the system of FIG. 2 wherein a passive polarization processing technique is used to present 3D video content to a viewer according to principles described herein.

FIG. 3 illustrates an exemplary implementation 300 of system 200 wherein a passive polarized processing technique is used to present 3D video content to a viewer. As shown in FIG. 3, implementation 300 may include a 3D media content processing device 302, display device 208, and a polarizing screen 304 mounted on or otherwise included within display device 208.

3D processing device 302 may include any suitable computing device (e.g., one or more media content projector devices, set-top box devices, personal computers, etc.) configured to be able to selectively present media content in 3D (i.e., 3D processing device 302 has the ability to present different images to the left and right eyes). 3D processing device 302 may be configured to receive a 3D video content stream, which, as shown in FIG. 3, may include a video frame 306 comprising data 308 representative of a left image intended for a left eye of a viewer and data 310 representative of a right image intended for a right eye of the viewer. Data 308 and 310 may be included and/or arranged in video frame 306 in any suitable manner.

As mentioned, in a passive polarized processing technique, left and right images are concurrently presented to the left and right eyes of a viewer. To this end, 3D processing device 302 may be configured to process video frame 306 and generate another video frame 312 that includes interleaved rows 314 (e.g., rows 314-1 and 314-2) of left image pixels and right image pixels. The left image pixels represent the left image defined by the left image data 308 included in video frame 306 and the right image pixels represent the right image defined by the right image data 310 included in video frame 306. 3D processing device 302 may then transmit interleaved video frame 312 to display device 208, which may use interleaved video frame 312 to concurrently display the interleaved rows 314 of left and right image pixels. The displayed left and right pixel rows 314 are represented by composite image 316 in FIG. 3.

Polarizing screen 304 may be configured to polarize the left and right pixel rows 314 in any suitable manner. For example, polarizing screen 304 may use linear polarization to polarize the left and right pixel rows 314 in orthogonal directions. Alternatively, polarizing screen 304 may use circular or any other type of passive polarization technique to polarize the left and right pixel rows 314. In this manner, a viewer wearing polarized 3D viewing glasses 318 with appropriately polarized lenses 320-1 and 320-2 may perceive the left and right images represented by the left and right pixel rows 314 as a 3D image.

It will be recognized that the passive polarized processing technique described in connection with FIG. 3 is merely illustrative of the many different types of passive polarized processing techniques that may be used in connection with the methods and systems described herein. For example, in some passive polarized processing techniques, the left and right image pixels are not interleaved into a single video frame and are instead transmitted as separate video frames.

Figure 4:
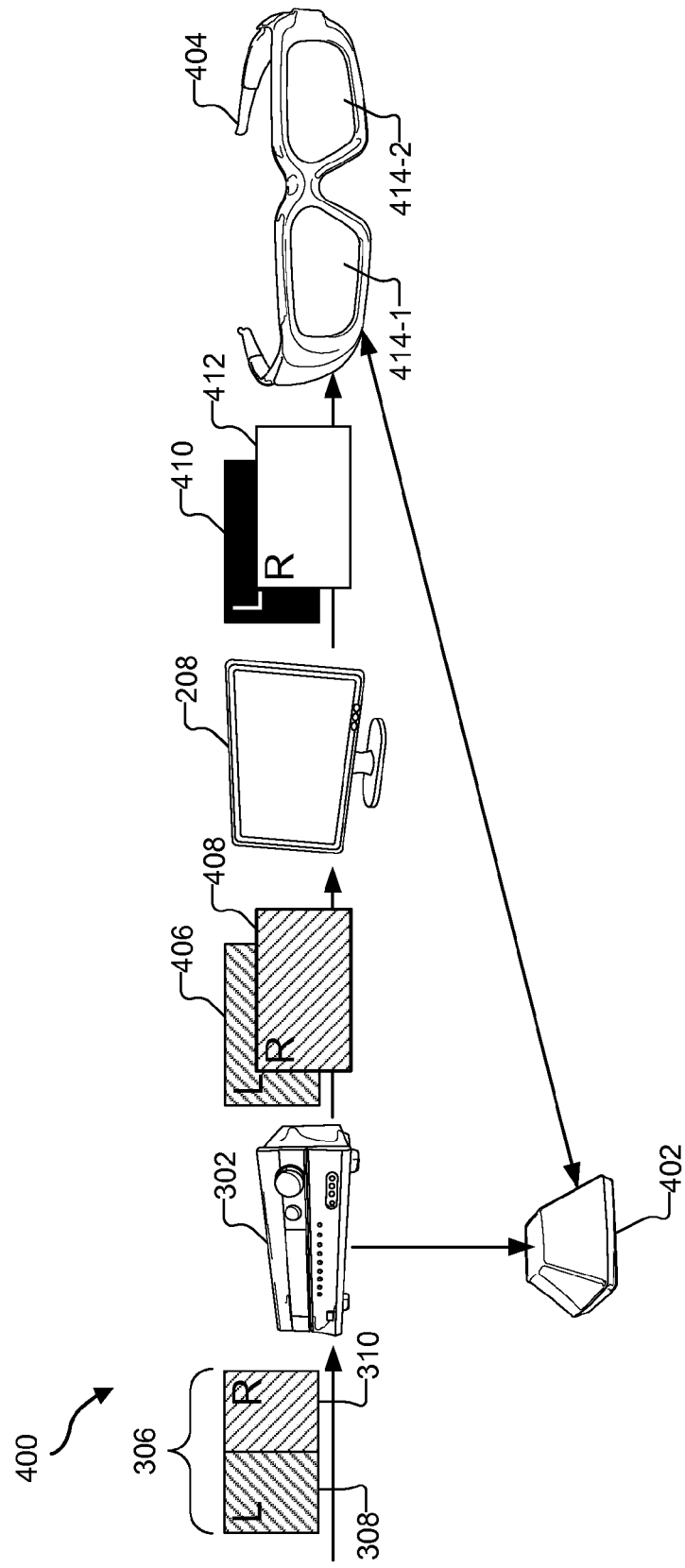
FIG. 4 illustrates another exemplary implementation of the system of FIG. 2 wherein an active shutter processing technique is used to present 3D video content to a viewer according to principles described herein.

FIG. 4 illustrates another exemplary implementation 400 of system 200 wherein an active shutter processing technique is used to present 3D video content to a viewer. As shown in FIG. 4, implementation 400 may include 3D processing device 302 in communication with display device 208. 3D processing device 302 may be further communicatively coupled to an infrared ("IR") transmitter 402, which may be configured to control an operation of active shutter 3D viewing glasses 404.

As mentioned, in an active shutter processing technique, distinct left and right images are presented to the left and right eyes, respectively, in an alternating manner. To this end, 3D processing device 302 may be configured to process video frame 306 and generate a left image frame 406 comprising the data representative of the left image and a right image frame 408 comprising the data representative of the right image. 3D processing device 302 may then transmit left and right image frames 406 and 408 to display device 208. Display device 208 may use left and right image frames 406 and 408 to sequentially display a left image 410 and a right image 412.

In some examples, left and right image frames 406 and 408 are provided to display device 208 by 3D processing device 302 for presentation at a presentation rate at least twice the transmission rate at which video frame 306 is received by 3D processing device 302. For example, 3D processing device 302 may receive video frame 306 at a transmission rate of 60 frames/second. In this example, 3D processing device 302 may provide left and right image frames 406 and 408 to display device 208 for presentation at a presentation rate of at least 120 frames/second. In this manner, the sequentiality of the display of left and right images 410 and 412 may go substantially unnoticed to the viewer, thereby resulting in a seamless 3D video content viewing experience for the viewer.

A viewer of left and right images 410 and 412 may wear active shutter 3D viewing glasses 404 in order to perceive images 410 and 412 as a single 3D image. Active shutter 3D viewing glasses 404 may include a right lens 414-1 and a left lens 414-2 (collectively referred to herein as "lenses 414"). Each lens 414 may be configured to act as a shutter (using, for example, liquid crystal technology) or may have a shutter associated therewith. For illustrative purposes only, it will be assumed in the examples given herein that each lens 414 has a shutter associated therewith. Each shutter may be electrically controlled to selectively close in order to momentarily obscure the view through its respective lens 414. For example, a right shutter associated with right lens 414-1 may be configured to be closed (e.g., effectively opaque) during the display of left image 410 and open (e.g., effectively transparent) during the display of right image 412. Likewise, a left shutter associated with left lens 414-2 may be configured to be closed during the display of right image 412 and open during the display of left image 410. In this manner, only the left image 410 is presented to the left eye and only the right image 412 is presented to the right eye.

IR transmitter 402 may be configured to control the opening and closing of the left and right shutters. To this end, IR transmitter 402 may receive information from 3D processing device 302 that indicates when either left or right images 410 or 412 is to be displayed by display device 208 and direct the left and right shutters to open and close accordingly. IR transmitter 402 may include any suitable combination of hardware and/or software and may be separate from 3D processing device 302, as shown in FIG. 4. Alternatively, IR transmitter 402 may be integrated into 3D processing device 302 in any suitable manner. Moreover, it will be recognized that any other type of transmission link (e.g., Bluetooth, a low power radio transmitter, etc.) may be used in place of IR transmitter 402.

The 3D media content processing techniques described in connection with FIGS. 3-4 are merely illustrative of the many 3D media content processing techniques that may be used in connection with the systems and methods described herein. As will be described in more detail below, the 3D media content processing techniques described in connection with FIGS. 3-4 may be used by system 100 to present adjunct content during a presentation of a media content instance.

Figure 5:
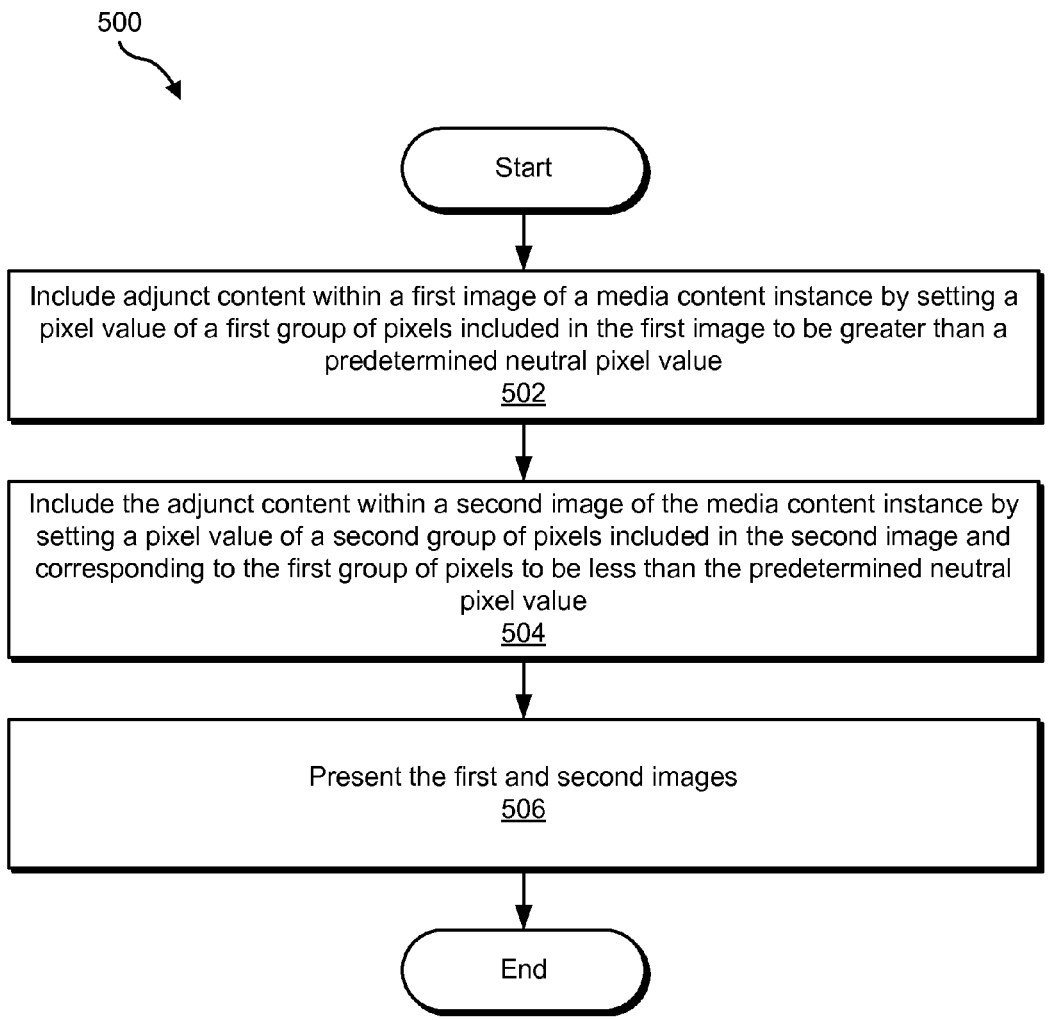
FIG. 5 illustrates an exemplary method of presenting adjunct content during a presentation of a media content instance according to principles described herein.

FIG. 5 illustrates an exemplary method 500 of presenting adjunct content during a presentation of a media content instance. While FIG. 5 illustrates exemplary steps according to one embodiment, other embodiments may omit, add to, reorder, and/or modify any of the steps shown in FIG. 5. The steps shown in FIG. 5 may be performed by any component or combination of components of system 100, media content provider subsystem 202, 3D content presentation subsystem 204, and/or 3D content processing device 302.

In step 502, adjunct content is included within a first image of a media content instance by setting a pixel value of a first group of pixels included in the first image to be greater than a predetermined neutral pixel value. In step 504, the adjunct content is included within a second image of the media content instance by setting a pixel value of a second group of pixels included in the second image and corresponding to the first group of pixels to be less than the predetermined neutral pixel value. In some examples, the first image includes a left image similar to the left images described herein and the second image includes a right image similar to the right images described herein. Alternatively, the first image includes a right image similar to the right images described herein and the second image includes a left image similar to the left images described herein. Steps 502 and 504 may be performed in any of the ways described herein.

In step 506, the first and second images are presented. The first and second images may be presented in any of the ways described herein.

In some examples, the pixel values of the first and second groups of pixels are set in steps 502 and 504 to result in the adjunct content being perceptible to a first viewer viewing only one of the first and second images during the presentation of the first and second images and substantially imperceptible to a second viewer viewing both the first and second images during the presentation of the first and second images.

Figure 6:
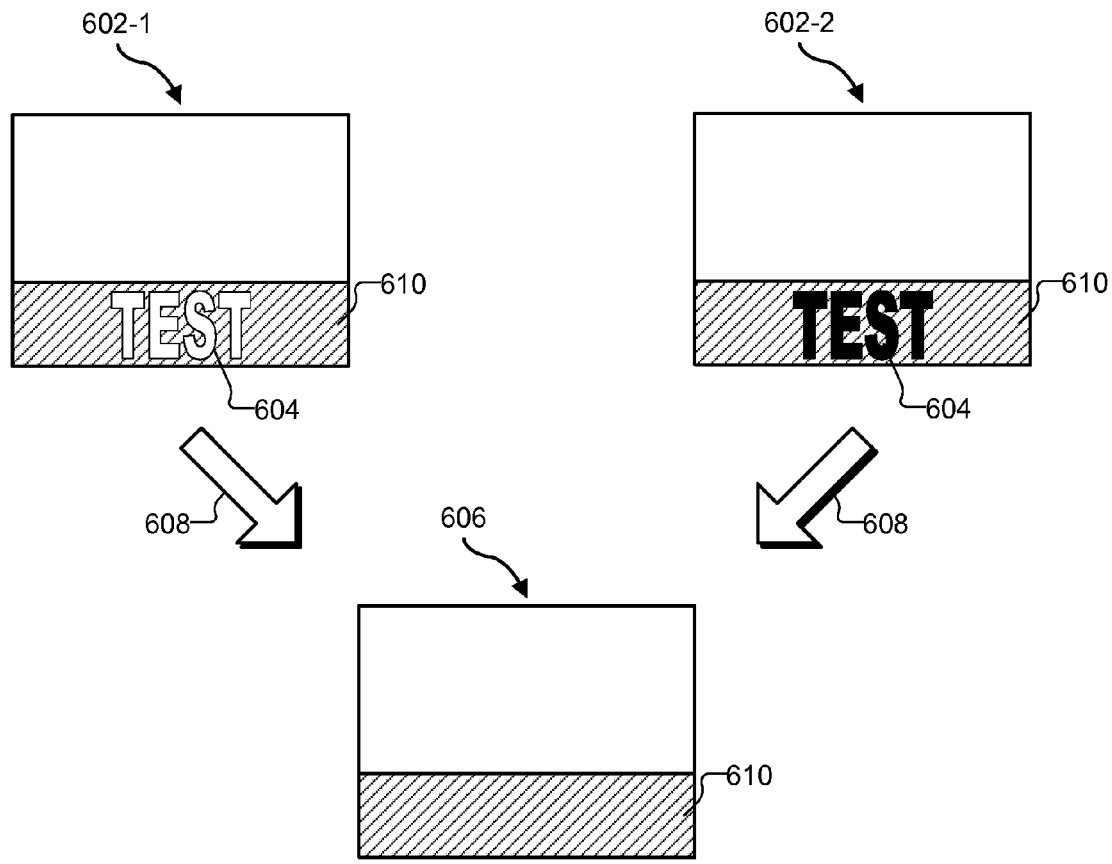
FIG. 6 shows first and second images each having adjunct content included therein according to principles described herein.

To illustrate, FIG. 6 shows first and second images 602-1 and 602-2 (collectively referred to herein as "images 602") each having adjunct content 604 included therein. Adjunct content 604 includes the word "test" for illustrative purposes only. It will be recognized that adjunct content 604 may include any other type of adjunct content described herein as may serve a particular implementation. As will be explained below, concurrent or sequential presentation (illustrated by arrows 608) of first and second images 602 to a viewer able to view both images 602 may cause the viewer to perceive a single composite image 606 without adjunct content 604 included therein. At the same time, the concurrent or sequential presentation of first and second images 602 to an additional viewer able to view only one of images 602 may cause the additional viewer to perceive an image having adjunct content 604 included therein.

Adjunct content 604 may be included in first and second images 602-1 and 602-2 by setting a brightness level of corresponding groups of pixels (i.e., pixels corresponding to the same locations within each image 602) included in first and second images 602-1 and 602-2, respectively, to be above and below a predetermined neutral brightness level. The predetermined neutral brightness level may include any neutral brightness level (e.g., a neutral gray color) as may serve a particular implementation.

For example, FIG. 6 shows that adjunct content 604 included in image 602-1 has a brightness level that has been set to be above a predetermined neutral brightness level while adjunct content 604 included in image 602-2 has a brightness level that has been set to be below the predetermined neutral brightness level. The brightness levels of the pixels associated with adjunct content 604 included in each image 602 may be set to effectively cancel each other out when perceived by a viewer viewing both images 602, thereby rendering adjunct content 604 substantially imperceptible to the viewer in composite image 606.

To illustrate, the brightness level of the pixels associated with adjunct content 604 included in first image 602-1 may be set to be substantially equal to one brightness unit greater than the predetermined neutral brightness level and the brightness level of the pixels associated with adjunct content 604 included in second image 602-2 may be set to be substantially equal to one brightness unit less than the predetermined neutral brightness level. As used herein, a "brightness unit" refers to any unit or measure of brightness or luminance as may serve a particular implementation. When viewed by a viewer able to view both images 602, the brightness units may cancel each other out, thereby causing the viewer to perceive a corresponding group of pixels in composite image 606 as having the predetermined neutral brightness level.

Additionally or alternatively, any other pixel value of the pixels associated with adjunct content 604 may be set to be any number of pixel value units above or below a predetermined neutral pixel value. For example, a color value of the pixels associated with adjunct content 604 included in first image 602-1 may be set to be greater than a predetermined color value and a color value level of the pixels associated with adjunct content 604 included in second image 602-2 may be set to be less than the predetermined color value such that when viewed by a viewer able to view both images 602, the color values may cancel each other out, thereby causing the viewer to perceive a corresponding group of pixels in composite image 606 as having the predetermined color value. For illustrative purposes, however, it will be assumed that only the brightness level of the pixels associated with adjunct content 604 are set in accordance with the methods and systems described herein.

It will be recognized that the brightness levels of the pixels associated with adjunct content 604 included in both images 602 may be adjusted or set by system 100 to compensate for non-linear response, habituation, and variable response times of the human vision system. For example, system 100 may periodically switch between including "light" and "dark" adjunct content in images 602. To illustrate, after a predetermined time period, system 100 may switch from assigning "light" adjunct content to left images and "dark" adjunct content to right images to assigning "dark" adjunct content to left images and "light" adjunct content to right images.

In some examples, as shown in FIG. 6, adjunct content 604 may be located within a neutral field 610 included in each of images 602. Neutral field 610 may be located within one of the margins or "pillars" that are often displayed when the aspect ratio of a media content instance is different than that of the display screen. However, it will be recognized that neutral field 610 may be located at any position within images 602 as may serve a particular implementation.

A pixel value (e.g., a brightness level) of neutral field 610 may be set to be substantially equal to the predetermined neutral pixel value. In this manner, the cancelation of the pixel values of the pixels associated with adjunct content 604 included in each image 602, as perceived by the human vision system, may render neutral field 610 void of adjunct content 604.

As mentioned, adjunct content 604 may be substantially imperceptible to a viewer able to view both images 602 during the presentation of images 602. A viewer may be able to view both images 602 in a number of different scenarios. For example, a viewer may be able to view both images 602 if, during the presentation of both images 602, the viewer is not wearing 3D viewing glasses. Without 3D viewing glasses, both eyes of the viewer may perceive both images 602. Consequently, the pixel values of the pixels associated with adjunct content 604 included in each image 602 may effectively cancel each other out, thereby rendering adjunct content 604 substantially imperceptible to the viewer.

Alternatively, a viewer may be able to view both images 602 if, during the presentation of images 602, the viewer is wearing 3D viewing glasses configured to allow a first eye of the viewer to perceive only first image 602-1 and a second eye of the viewer to perceive only second image 602-2 and if the viewer has both eyes open during the presentation of images 602.

For example, images 602 may be concurrently presented in accordance with a passive polarized processing technique. During the concurrent presentation of images 602, a viewer may be wearing polarized 3D viewing glasses (such as or similar to polarized 3D viewing glasses 318) that have a first lens that includes a first type of polarizing filter configured to allow a left eye of the viewer to perceive only first image 602-1 and a second lens that includes a second type of polarizing filter configured to allow a right eye of the viewer to perceive only second image 602-2. With both eyes open, the viewer is able to see both images 602 through the polarized 3D viewing glasses, even though only one image is presented to each eye of the viewer. As a result, the brightness levels of the pixels associated with adjunct content 604 included in each image 602 may effectively cancel each other out, thereby rendering adjunct content 604 substantially imperceptible to the viewer.

As another example, images 602 may be sequentially presented in accordance with an active shutter processing technique. During the sequential presentation of images 602, a viewer may be wearing active shutter 3D viewing glasses, such as or similar to active shutter 3D viewing glasses 404. A right shutter associated with a right lens of the active shutter 3D viewing glasses may be closed during the presentation of first image 602-1 and open during the presentation of second image 602-2. Likewise, a left shutter associated with a left lens of viewing glasses may be open during the presentation of first image 602-1 and closed during the presentation of second image 602-2. With both eyes open, the viewer is able to see both images 602 through the active shutter 3D viewing glasses, even though only one image is presented to each eye of the viewer. As a result, the brightness levels of the pixels associated with adjunct content 604 included in each image 602 may effectively cancel each other out, thereby rendering adjunct content 604 substantially imperceptible to the viewer.

Adjunct content 604 may be perceptible to another viewer able to view only one of images 602 during the presentation of images 602. A viewer may be able to view only one of images 602 in a number of different scenarios. Exemplary scenarios in which a viewer is able to view only one of two concurrently or sequentially presented images 602 will now be described.

In some examples, a viewer may be able to view only one of images 602 and thereby perceive adjunct content 604 if, during the presentation of images 602, the viewer is wearing 3D viewing glasses (such as or similar to either polarized 3D viewing glasses 318 or active shutter 3D viewing glasses 404) and if the viewer has only one of his or her eyes open during the presentation of images 602.

To illustrate, a viewer may be wearing 3D viewing glasses during the presentation of images 602 that allow only first image 602-1 to be presented to the viewer's left eye and only second image 602-2 to be presented to the viewer's right eye. To perceive adjunct content 604, the viewer may simply close one of his or her eyes, thereby preventing the brightness level of the pixels associated with the adjunct content 604 included in the image presented to the closed eye from canceling out the brightness level of the pixels associated with the adjunct content 604 included in the image presented to the open eye. To illustrate, the viewer may perceive adjunct content 604 having a brightness level greater than the predetermined neutral brightness level by closing his or her right eye. Alternatively, the viewer may perceive adjunct content 604 having a brightness level less than the predetermined neutral brightness level by closing his or her left eye.

In some examples, system 100 may selectively permit a viewer to view only one of first and second images 602. In this manner, adjunct content 604 may be presented to the viewer without the viewer having to close one of his or her eyes.

To illustrate, a viewer may be wearing 3D viewing glasses during the presentation of images 602 that allow only first image 602-1 to be presented to the viewer's left eye and only second image 602-2 to be presented to the viewer's right eye. System 100 may selectively permit the viewer to view only one of images 602 by obscuring vision of one of the viewer's eyes during the presentation of images 602. Vision of an eye may be obscured in any manner as may serve a particular implementation. For example, a lens included in the 3D viewing glasses worn by the viewer may be covered or otherwise obscured during the presentation of images 602 or electronically controlled to remain open or closed to disrupt the cancelation effect.

As another example, a viewer may be wearing active shutter 3D viewing glasses during the presentation of images 602. System 100 may selectively permit a viewer to view only one of first and second images 602 by directing both shutters of the active shutter 3D viewing glasses to be open during the presentation of one of the images 602 (e.g., during the presentation of first image 602-1) and closed during the presentation of the other one of the images 602 (e.g., during the presentation of second image 602-2). In this manner, the same image (e.g., first image 602-1) is presented to both eyes, thereby allowing the viewer to view adjunct content 604.

In some examples, a viewer may view only one of first and second images 602 and thereby perceive adjunct content 604 by wearing polarized viewing glasses having lenses that each include an identical type of polarizing filter. For example, images 602 may be concurrently presented to a viewer in accordance with a passive polarized processing technique. During the concurrent presentation of images 602, the viewer may wear viewing glasses having lenses that each include a polarizing filter configured to allow only first image 602-1 to be presented to each eye of the viewer. In this manner, adjunct content 604 included in first image 602-1 may be perceived by the viewer. Alternatively, the viewer may wear viewing glasses having lenses that each include a polarizing filter configured to allow only second image 602-2 to be presented to each eye of the viewer. In this manner, adjunct content 604 included in second image 602-2 may be perceived by the viewer.

In some examples, a viewer may be provided with viewing glasses having lenses that may be interchanged, rotated, or otherwise modified in accordance with the desires of the viewer to view adjunct content. For example, a viewer may desire to view a media content instance in 3D without seeing adjunct content. In this case, the viewer may use polarized 3D viewing glasses having lenses with different type of filters included therein. The viewer may subsequently desire to view the media content instance along with the adjunct content. In the case of linear polarization, the viewer may rotate one of the lenses by ninety degrees so that both eyes see the same image. Alternatively (e.g., in the case of circular polarization), one of the lenses may be interchanged with a lens having the same type of polarizing filter as the other lens included in the 3D viewing glasses.

An exemplary implementation of the methods and systems described herein will now be described in connection with FIGS. 7-8. It will be recognized that the exemplary implementation described in connection with FIGS. 7-8 is merely illustrative of the many different scenarios in which the methods and systems described herein may be employed.

Figure 7:
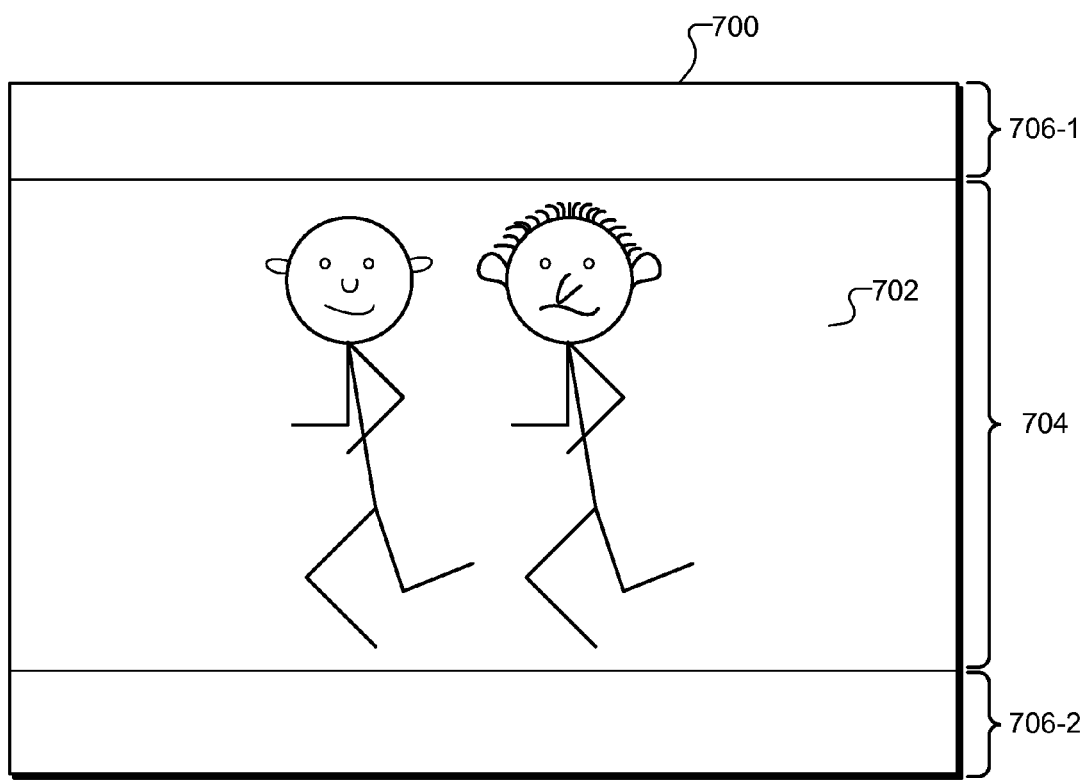
FIG. 7 illustrates an exemplary display screen having a particular scene of a media content instance displayed therein according to principles described herein.
Figure 8:
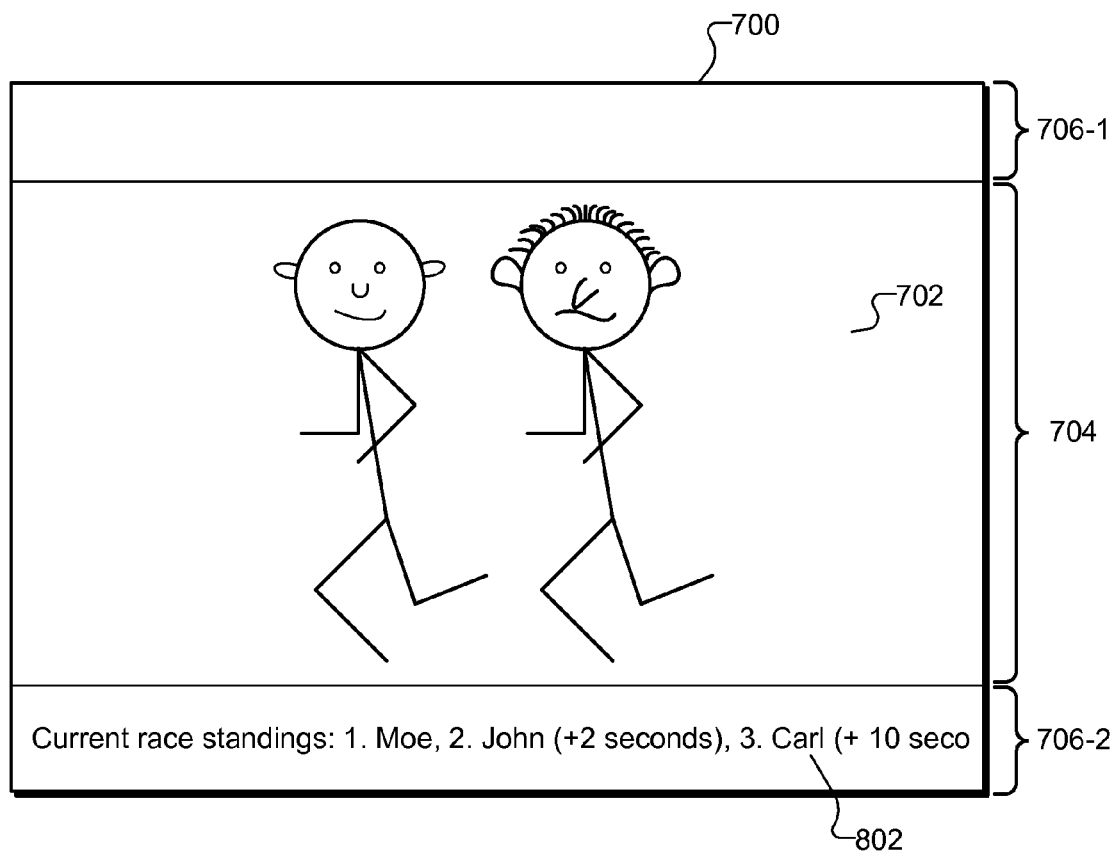
FIG. 8 shows the display screen of FIG. 7 with adjunct content displayed therein according to principles described herein.

FIG. 7 illustrates an exemplary display screen 700 having a particular scene of a media content instance 702 (e.g., a live broadcast of a sporting event) displayed therein. As shown in FIG. 7, media content instance 702 may be displayed within a main content portion 704 of display screen 700. Media content instance 702 may be displayed in 2D or 3D as may serve a particular implementation.

One or more blank portions 706 (e.g., blank portions 706-1 and 706-2) may also be displayed within display screen 700. Blank portions 706 may be displayed above and/or below main content portion 706, as shown in FIG. 7, or at any other location within display screen 700 as may serve a particular implementation. In some examples, blank portions 706 may be displayed when the aspect ratio of media content instance 702 is different than that of display screen 700. Alternatively, one or more blank portions 706 may be displayed as specified by system 100.

In some examples, display screen 700 may be a part of a television device located within a particular household. Two or more members of the household may decide to watch media content instance 702 within display screen 700 together. One of the household members (e.g., the wife) may desire to watch media content instance 702 without concurrently seeing any type of adjunct content within display screen 700. However, another member of the household (e.g., the husband) may be extremely interested in the media content instance 702 and therefore desire to see real time statistics or other types of adjunct content related to media content instance 700. In this scenario, the viewing desires of both household members may be concurrently satisfied by the methods and systems described herein.

To illustrate, media content instance 702 may be presented in the form of multiple pairs of first and second images (e.g., left and right images) as described herein. Each image may have adjunct content included therein (e.g., within one or more of blank portions 706). To see the media content instance 702 without perceiving the adjunct content, the wife may either watch the media content instance 702 without 3D viewing glasses or with 3D viewing glasses that allow her to view both images included in each pair of presented images. The husband, on the other hand, may perceive the adjunct content by wearing viewing glasses that allow him to view only one image included in each pair of presented images in any of the ways described herein. Exemplary adjunct content that may be perceived by the husband is shown in FIG. 8. As shown in FIG. 8, adjunct content 802 may be displayed within blank portion 706-2. Adjunct content 802 may be additionally or alternatively displayed at any other location within display screen 700 as may serve a particular implementation.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 9:
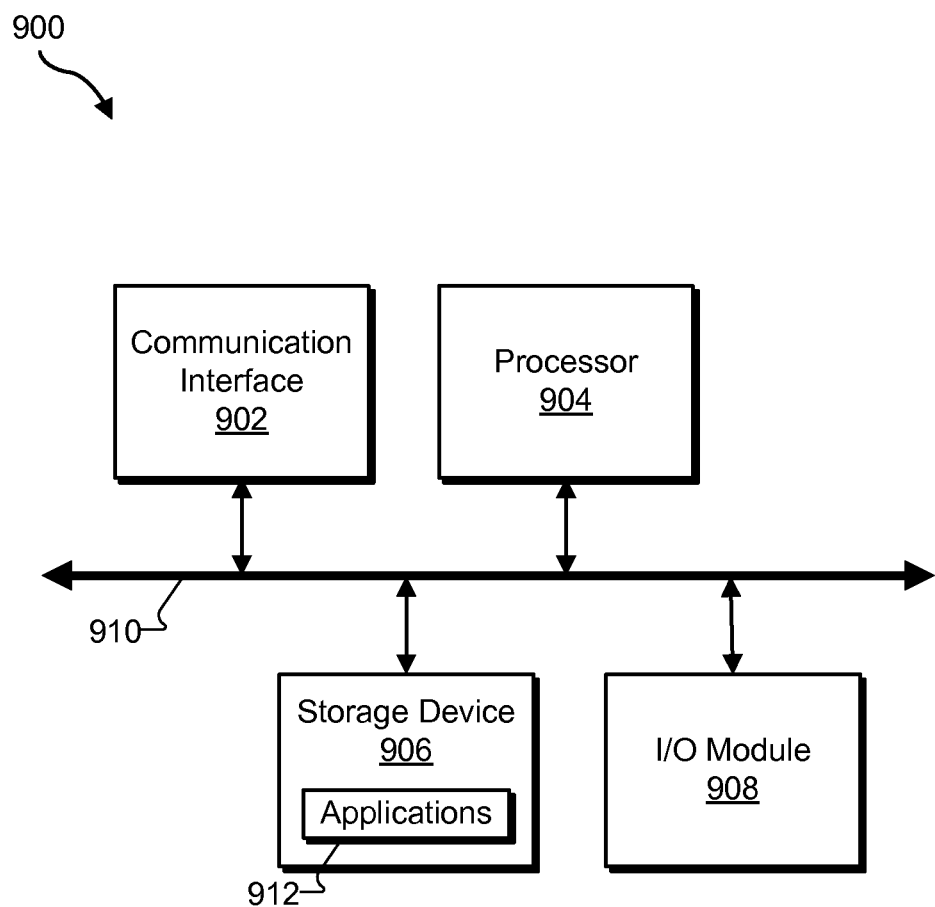
FIG. 9 illustrates an exemplary computing device according to principles described herein.

FIG. 9 illustrates an exemplary computing device 900 that may be configured to perform one or more of the processes described herein. As shown in FIG. 9, computing device 900 may include a communication interface 902, a processor 904, a storage device 906, and an input/output ("I/O") module 908 communicatively connected via a communication infrastructure 910. While an exemplary computing device 900 is shown in FIG. 9, the components illustrated in FIG. 9 are not intended to be limiting. Additional or alternative components may be used in other embodiments. Components of computing device 900 shown in FIG. 9 will now be described in additional detail.

Communication interface 902 may be configured to communicate with one or more computing devices. Examples of communication interface 902 include, without limitation, a wired network interface (such as a network interface card), a wireless network interface (such as a wireless network interface card), a modem, an audio/video connection, and any other suitable interface.

Processor 904 generally represents any type or form of processing unit capable of processing data or interpreting, executing, and/or directing execution of one or more of the instructions, processes, and/or operations described herein. Processor 904 may direct execution of operations in accordance with one or more applications 912 or other computer-executable instructions such as may be stored in storage device 906 or another computer-readable medium.

Storage device 906 may include one or more data storage media, devices, or configurations and may employ any type, form, and combination of data storage media and/or device. For example, storage device 906 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 906. For example, data representative of one or more executable applications 912 (which may include, but are not limited to, one or more of the software applications described herein) configured to direct processor 904 to perform any of the operations described herein may be stored within storage device 906. In some examples, data may be arranged in one or more databases residing within storage device 906.

I/O module 908 may be configured to receive user input and provide user output and may include any hardware, firmware, software, or combination thereof supportive of input and output capabilities. For example, I/O module 908 may include hardware and/or software for capturing user input, including, but not limited to, a keyboard or keypad, a touch screen component (e.g., touch screen display), a receiver (e.g., an RF or infrared receiver), and/or one or more input buttons.

I/O module 908 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 908 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 900. For example, one or more applications 912 residing within storage device 906 may be configured to direct processor 904 to perform one or more processes or functions associated with media content management facility 102, adjunct content management facility 104, and/or presentation facility 106. Likewise, storage facility 108 may be implemented by or within storage device 906.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
including, by an adjunct content presentation system, main content within a first image of a media content instance and a second image of the media content instance;
including, by the adjunct content presentation system, adjunct content within the first image by setting a pixel value of a first group of pixels included in the first image to be greater than a predetermined neutral pixel value;
including, by the adjunct content presentation system, the adjunct content within the second image by setting a pixel value of a second group of pixels included in the second image and corresponding to the first group of pixels to be less than the predetermined neutral pixel value; and
presenting, by the adjunct content presentation system, the first and second images;
wherein
the pixel values of the first and second groups of pixels are set to result in the adjunct content being perceptible to a first viewer viewing only one of the first and second images during the presentation of the first and second images and substantially imperceptible to a second viewer viewing both the first and second images during the presentation of the first and second images, and
the main content is perceptible to the first viewer viewing the only one of the first and second images during the presentation of the first and second images and the second viewer viewing the both the first and second images during the presentation of the first and second images.

2. The method of claim 1, wherein, during the presentation of the first and second images, the second viewer:
is wearing three-dimensional ("3D") viewing glasses configured to allow a first eye of the second viewer to perceive only the first image and a second eye of the second viewer to perceive only the second image; and
has both the first and second eyes open during the presentation of the first and second images.

3. The method of claim 1, wherein, during the presentation of the first and second images, the second viewer is not wearing three-dimensional ("3D") viewing glasses.

4. The method of claim 1, wherein, during the presentation of the first and second images, the first viewer:
is wearing three-dimensional ("3D") viewing glasses configured to allow a first eye of the first viewer to perceive only the first image and a second eye of the first viewer to perceive only the second image; and
has only one of the first and second eyes open during the presentation of the first and second images.

5. The method of claim 1, further comprising selectively permitting, by the adjunct content presentation system, the first viewer to view the only one of the first and second images.

6. The method of claim 5, wherein, during the presentation of the first and second images, the first viewer is wearing three-dimensional ("3D") viewing glasses, and wherein the selectively permitting the first viewer to view the only one of the first and second images comprises selectively obscuring vision of a single eye of the first viewer during the presentation of the first and second images.

7. The method of claim 5, wherein, during the presentation of the first and second images, the first viewer is wearing active shutter three-dimensional ("3D") viewing glasses, and wherein the selectively permitting the first viewer to view the only one of the first and second images comprises:
directing a right shutter associated with a right lens of the active shutter 3D viewing glasses and a left shutter associated with a left lens of the active shutter 3D viewing glasses to both be open during the presentation of one of the first and second images and to both be closed during the presentation of the other one of the first and second images.

8. The method of claim 1, wherein the presenting of the first and second images comprises concurrently presenting the first and second images in accordance with a passive polarized processing technique.

9. The method of claim 8, wherein, during the concurrent presentation of the first and second images, the first viewer is wearing viewing glasses comprising first and second lenses each comprising an identical type of polarizing filter such that each eye of the first viewer sees the only one of the first and second images.

10. The method of claim 1, wherein the presenting of the first and second images comprises sequentially presenting the first and second images in accordance with an active shutter processing technique.

11. The method of claim 1, wherein the adjunct content is included within a neutral field that is a part of the first and second images, the neutral field having a pixel value substantially equal to the predetermined neutral pixel value.

12. The method of claim 1, wherein the adjunct content comprises at least one of subtitle content, text messaging content, and ticker tape content.

13. The method of claim 1, wherein:
the pixel value of the first group of pixels included in the first image is substantially equal to one pixel value unit greater than the predetermined neutral pixel value; and the pixel value of the second group of pixels included in the second image is substantially equal to one pixel value unit less than the predetermined neutral pixel value.

14. The method of claim 1, wherein the pixel value of the first group of pixels represents a brightness level of the first group of pixels and the pixel value of the second group of pixels represents a brightness level of the second group of pixels.

15. The method of claim 1, embodied as computer-executable instructions on at least one non-transitory computer-readable medium.

16. A method comprising:
including, by an adjunct content presentation system, adjunct content within a first image of a media content instance by setting a pixel value of a first group of pixels included in the first image to be greater than a predetermined neutral pixel value; and
including, by the adjunct content presentation system, the adjunct content within a second image of the media content instance by setting a pixel value of a second group of pixels included in the second image and corresponding to the first group of pixels to be less than the predetermined neutral pixel value;
concurrently presenting, by the adjunct content presentation system, the first and second images in accordance with a passive polarized processing technique;
wherein the pixel values of the first and second groups of pixels are set to result in the adjunct content being perceptible to a viewer wearing viewing glasses during the concurrent presentation of the first and second images, the viewing glasses comprising first and second lenses each comprising an identical type of polarizing filter.

17. The method of claim 16, wherein the pixel values of the first and second groups of pixels are further configured to result in the adjunct content being substantially imperceptible to an additional viewer wearing three-dimensional ("3D") viewing glasses during the concurrent presentation of the first and second images, the 3D viewing glasses comprising a first lens that has a first type of polarizing filter configured to allow a first eye of the additional viewer to perceive only the first image and a second lens that has a second type of polarizing filter configured to allow a second eye of the additional viewer to perceive only the second image.

18. The method of claim 16, embodied as computer-executable instructions on at least one non-transitory computer-readable medium.

19. A method comprising:
including, by an adjunct content presentation system, main content within a first image of a media content instance and a second image of the media content instance;
including, by the adjunct content presentation system, adjunct content within the first image by setting a pixel value of a first group of pixels included in the first image to be greater than a predetermined neutral pixel value;
including, by the adjunct content presentation system, the adjunct content within the second image by setting a pixel value of a second group of pixels included in the second image and corresponding to the first group of pixels to be less than the predetermined neutral pixel value;
sequentially presenting, by the adjunct content presentation system, the first and second images in accordance with an active shutter processing technique; and
permitting a viewer wearing active shutter three-dimensional ("3D") viewing glasses to perceive the adjunct content by directing a right shutter associated with a right lens of the active shutter 3D viewing glasses and a left shutter associated with a left lens of the active shutter 3D viewing glasses to both be open during the presentation of one of the first and second images and to both be closed during the presentation of the other one of the first and second images;
wherein
the pixel values of the first and second groups of pixels are set to result in the adjunct content being substantially imperceptible to a second viewer viewing both the first and second images during the presentation of the first and second images, and
the main content is perceptible to the viewer wearing the active shutter 3D viewing glasses during the presentation of the first and second images and the second viewer viewing the both the first and second images during the presentation of the first and second images.

20. The method of claim 19, embodied as computer-executable instructions on at least one non-transitory computer-readable medium.

21. A method comprising:
including, by an adjunct content presentation system, main content within a first image of a media content instance and a second image of the media content instance;
including, by the adjunct content presentation system, adjunct content within the first image by setting a pixel value of a first group of pixels included in the first image to be greater than a predetermined neutral pixel value; and
including, by the adjunct content presentation system, the adjunct content within the second image by setting a pixel value of a second group of pixels included in the second image and corresponding to the first group of pixels to be less than the predetermined neutral pixel value;
wherein
the pixel values of the first and second groups of pixels are set to result in the adjunct content being perceptible to a first viewer viewing only one of the first and second images during a presentation of the first and second images and substantially imperceptible to a second viewer viewing both the first and second images during the presentation of the first and second images, and
the main content is perceptible to the first viewer viewing the only one of the first and second images during the presentation of the first and second images and the second viewer viewing the both the first and second images during the presentation of the first and second images.

22. The method of claim 21, embodied as computer-executable instructions on at least one non-transitory computer-readable medium.

23. A system comprising:
an adjunct content management facility configured to
include main content within a first image of a media content instance and a second image of the media content instance,
include adjunct content within the first image by setting a pixel value of a first group of pixels included in the first image to be greater than a predetermined neutral pixel value, and
include the adjunct content within the second image by setting a pixel value of a second group of pixels included in the second image and corresponding to the first group of pixels to be less than the predetermined neutral pixel value; and a presentation facility communicatively coupled to the adjunct content facility and configured to present the first and second images;

wherein
the pixel values of the first and second groups of pixels are configured to result in the adjunct content being perceptible to a first viewer viewing only one of the first and second images during the presentation of the first and second images and substantially imperceptible to a second viewer viewing both the first and second images during the presentation of the first and second images, and the main content is perceptible to the first viewer viewing the only one of the first and second images during the presentation of the first and second images and the second viewer viewing the both the first and second images during the presentation of the first and second images.

* * * * *